May 23, 1933. A. BICKEL Re. 18,838

CONCRETE MIXER

Original Filed July 17, 1922 2 Sheets-Sheet 1

Inventor
ACKERT BICKEL
By Finnegan & Finnegan
his Attorneys

May 23, 1933. A. BICKEL Re. 18,838

CONCRETE MIXER

Original Filed July 17, 1922 2 Sheets-Sheet 2

Inventor
ACKERT BICKEL
By Finnell & Finnell
his Attorneys

Reissued May 23, 1933

Re. 18,838

UNITED STATES PATENT OFFICE

ACKERT BICKEL, OF KANSAS CITY, MISSOURI, ASSIGNOR TO THE JAEGER MACHINE COMPANY, OF COLUMBUS, OHIO, A CORPORATION OF OHIO

CONCRETE MIXER

Original No. 1,650,592, dated November 29, 1927, Serial No. 575,515, filed July 17, 1922. Application for reissue filed October 31, 1929. Serial No. 403,876.

The present invention relates to mixing apparatus and aims to provide an improved mixer construction characterized by a novel and efficient means for effecting both the agitating of the material in the mixing operation and also the discharge of each batch of material from the mixing chamber.

For this purpose, I have devised a mixing receptacle provided with agitating means or blades cooperating in the rotative movement of the receptacle for carrying out the mixing operation, and thereafter operating while the receptacle is maintained stationary to effect the discharge of the contents from the receptacle.

It is also sought to improve generally this type of machine, by providing a more efficient construction and improved operation, and an increased capacity for each apparatus, while maintaining the cost of manufacture of the machine at practically a minimum.

With these general objects in view, the invention will now be described by reference to accompanying drawings illustrating one form of apparatus which I have devised for embodying the improvements proposed, after which those features deemed to be novel will be particularly set forth in the claims.

In the drawings—

Figure 1:
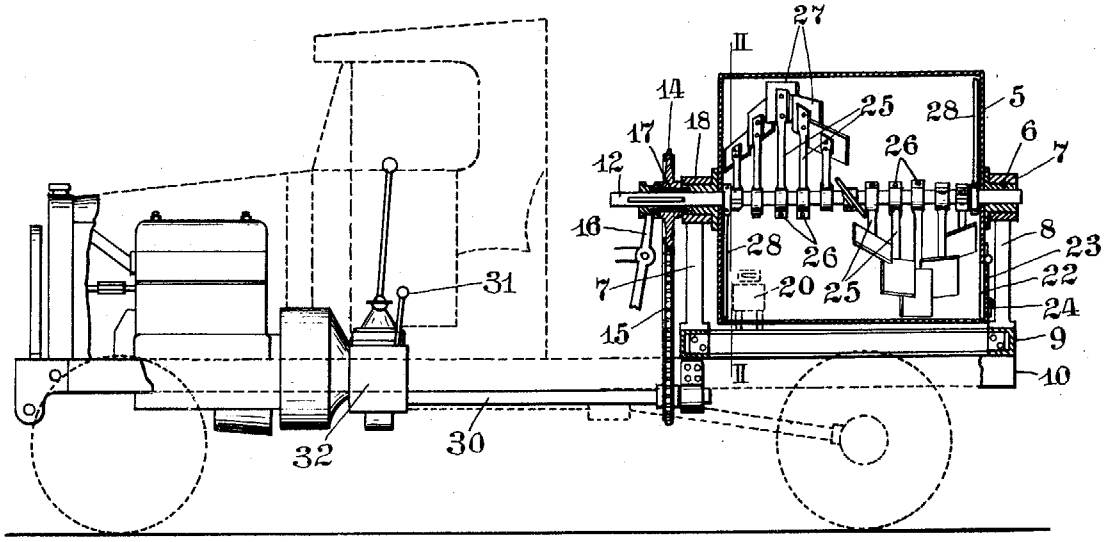
Figure 1 is a central vertical sectional view of a mixing apparatus constructed in accordance with the present invention.
Figure 4:
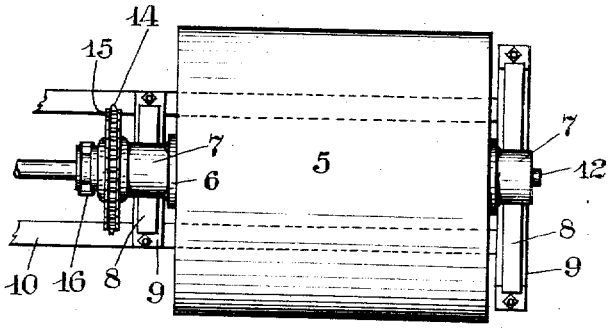
Figure 4 is a plan view of the same, on a reduced scale.

Referring now to the said drawings in detail, these illustrate the apparatus as comprising a mixing drum 5 provided with journals 6 mounted in bearings 7 on standards 8 supported on any suitable framework, such as transverse channels 9 forming part of a framework adapted to be carried by the chassis 10 an ordinary truck used for transporting the mixer, such as shown in Fig. 1. Such a truck usually has a power take-off shaft such as shown at 30 for rotating the mixing drum at a reduced speed and in either direction by means of a hand lever 31 and suitable gears in housing 32. The journals 6 also provide bearings for a shaft 12 which is thus mounted coaxially with reference to the drum, and is adapted to be rotated by means of a sprocket wheel 14 or the like, slidingly keyed to said shaft and actuated by a drive chain 15. The sprocket wheel is adapted to be shifted in any well known manner, by means of a shift lever 16, for the purpose of effecting clutching or unclutching engagement of pins 17 with recesses 18 in the outer ends of the journals 6 (see Figure 1), thereby connecting or disconnecting the drive from the shaft 12 to the drum 5. By this means the shaft 12 can be rotated independently of the drum 5, at which time the latter is maintained stationary by the action of a suitable brake 20 mounted on one of the frame pieces 9 and adapted to be operated manually into frictional engagement with the periphery of the drum. At one end, the drum is formed with an opening 22, having one edge flush with the drum's periphery, and adapted to be maintained closed during the mixing operation by a hinged door 23 provided with latch elements 24.

Figure 2:
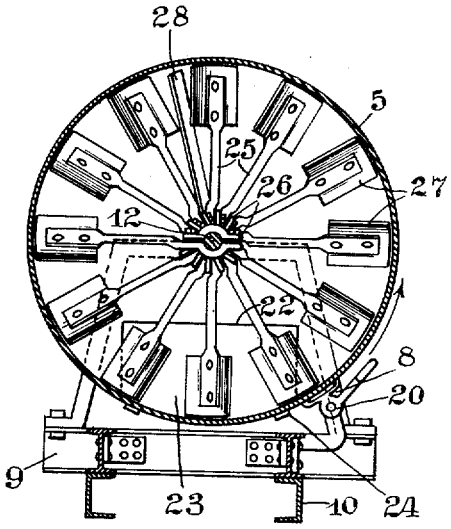
Figure 2 is a transverse section, taken on the line II—II of Figure 1.

Inside the drum, a plurality of arms 25 are secured to the shaft 12 by means of split clamping elements 26, the arrangement of said arms being such as to form a series extending in a spiral or helical direction about the axis of said shaft. The outer ends of the arms 25 are equipped with material-engaging and lifting blades 27 occupying positions at an angle to the shaft (see Figure 1 and 2) and forming in effect what may be termed a sectional helical conveyor with the sections thereof overlapping and at the same time affording sufficient clearance for the material to work its way between the sections or blades and preventing any clogging action of the parts. Adjacent each end of the drum, a scraper arm 28 is secured to the shaft 12 in position to effect scraping engagement with the end walls of the drum compartment, and thus intermittently removing the material adhering thereto.

Figure 3:
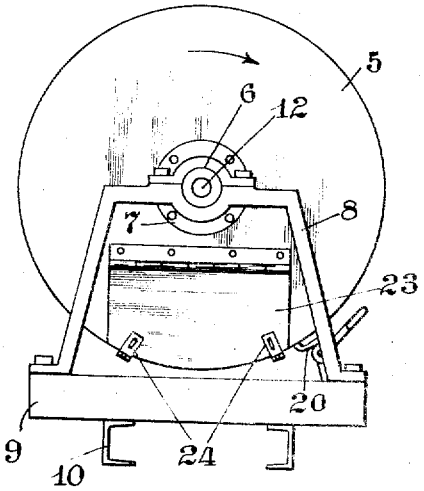
Figure 3 is an end view of the machine.

In operation, the drive to the drum 5 is disconnected by unclutching the sprocket 14 and brought to a stand still by the application of the brake 20, being stopped in such a position as to bring the opening 22 above the shaft 12 to allow a batch of the material to be fed into the drum or mixing compartment. The opening is then closed by means of the door 23, and the brake released and the sprocket 14 clutched with the adjacent journal 6 to restore the drive to the drum. The drum 5 and arms 25 with their blades 27 now rotate in unison about the axis of the shaft, in which operation it will be apparent that the arms and blades exert a continuous agitating and mixing action upon the batch of material, due to said arms and blades alternately sweeping through the material as they pass beneath the shaft and then lifting and releasing the material as they pass through the arc above the shaft. As above indicated, the broken helical arrangement of this agitating and mixing structure affords sufficient clearance for the described movement of the arms and blades to avoid any clogging or choking action in the mixing operation, the scraper arms 28 further cooperating to keep any of the material from collecting on the end walls of the mixer. At the end of the usual period allowed for the mixing operation according to one mode of use the sprocket wheel 15 is unclutched from the adjacent journal 6 to disconnect the drive to the drum, and the latter brought to a stand-still by means of the brake and with the opening 22 in the position shown in Figures 1 and 3, to allow the discharge of the material. While the drum is maintained stationary and the door 23 unlatched to allow the same to be swung open, the rotation of the shaft 12 is continued, with the result that the conveyor or impeller action of the blades 27 operates to feed the material in the direction of said opening 22 until substantially the entire contents of the drum are expelled from the mixing compartment. The continued operation is then simply a repetition of the foregoing.

It is obvious, however, that the door 23 can be left open and the mixing drum and blades rotated together to effect by their impeller action referred to discharge the mixed material but in such case the discharge may be regularly intermittent. It is thus apparent that the described construction constitutes an extremely simple and yet entirely efficient and economical apparatus for this class of work. It is very evident that the method of mixing herein described, involving the movement of the mixing blades operating in unison with the drum about the same axis during the mixing operation, can be carried out with far less power effort than any operation requiring a screw-like agitating and mixing action produced within a stationary mixing drum, which would have the effect principally of packing the material in one end of the mixing chamber unless the material be sufficiently fluid to avoid this. This is a feature of great advantage in connection with mixers transported on trucks and designed to carry out the mixing operation while the truck is in transit and with power derived from the same motor as is used to drive the truck. Another chief advantage is the gain in capacity over the common type of mixer provided with a central, axial opening and operating with a batch which can not, of course, exceed half the volume of the mixing chamber, whereas in the present construction the design permits the mixing chamber to be charged to at least a level with the margin of the opening 22 when the latter is located in receiving position or above the shaft 12, thus charging the mixer more than half full. A further feature of advantage is that the mixing operation is carried out with the mixer opening 23 closed, which is important in connection with mixing in transit, since there is no opportunity for losing any of the contents from the mixer due to the swash of the material, this loss of material being one of the disadvantages characterizing all of the common types of mixers provided with the central or axial opening and having no provision for closing the same during the mixing process.

While I have illustrated and described what I now regard as the preferred form of embodiment of the proposed improvements, I desire to reserve the right to make all such changes or modifications as may fairly fall within the scope of the appended claims.

What I claim is:

1. A mixing apparatus comprising a rotating receptacle having one of its ends provided with a discharge outlet, material-engaging means carried within said receptacle and including a plurality of blades all inclined with reference to the axis of the receptacle at angles adapted to impel the material, by the joint action of said blades, continuously in one direction toward said outlet, means for rotating said receptacle and material-engaging means in unison for effecting the mixing operation, and means for maintaining said receptacle stationary and effecting the discharge of the material through said outlet by the continued operation of said material-engaging means.

2. A mixing apparatus comprising a rotating receptacle having an opening for receiving and discharging the material, a plurality of arms carrying blades arranged helically about the axis of the receptacle, said blades being progressively inclined with reference to said axis at angles adapted to impel the material by the joint action of said blades, continuously in the direction of said opening, means for rotating said receptacle and arms in unison about said axis, and means for maintaining said receptacle stationary and effecting the discharge of the material through said opening by the continued rotation of said arms.

3. In a concrete mixer, a truck, a cylindrical receptacle mounted thereon to rotate on a fixed substantially horizontal axis, said receptacle having at its end an eccentrically located opening for charging and discharging said receptacle, a portion of said opening substantially coinciding with the convex wall of said receptacle, spirally arranged means in said receptacle adapted to mix and agitate the concrete materials in said receptacle and move the same toward and through said opening when the latter is in its lower position, a removable closure for said opening and means for fixing the same in closed position during the mixing and agitating operation, and power means carried by the truck for rotating said receptacle and mixing and agitating means.

4. In a concrete mixer, a truck, a cylindrical receptacle mounted thereon to rotate on a fixed substantially horizontal axis, said receptacle having at its end an eccentrically located opening for charging and discharging said receptacle, a portion of said opening substantially coinciding with the convex wall of said receptacle, spirally arranged means in said receptacle adapted to mix and agitate the concrete materials in said receptacle and move the same toward and through said opening when the latter is in its lower position, a removable closure for said opening and means for fixing the same in closed position during the mixing and agitating operation, and power means carried by the truck for rotating said mixing and agitating means independently of the receptacle.

5. In a concrete mixer, a truck, a cylindrical receptacle mounted thereon to rotate on a fixed substantially horizontal axis, said receptacle having at its end an eccentrically located opening for charging and discharging said receptacle, a portion of said opening substantially coinciding with the convex wall of said receptacle, spirally arranged means in said receptacle adapted to mix and agitate the concrete materials in said receptacle and move the same toward and through said opening when the latter is in its lower position, a removable closure for said opening and means for fixing the same in closed position during the mixing and agitating operation, and power means carried by the truck for rotating said receptacle and spirally arranged means.

6. In a concrete mixer, a truck, a cylindrical receptacle mounted thereon to rotate on a fixed substantially horizontal axis, said receptacle having at its end an eccentrically located opening for charging and discharging said receptacle, a portion of said opening substantially coinciding with the convex wall of said receptacle, spirally arranged means in said receptacle adapted to mix and agitate the concrete materials in said receptacle and move the same toward and through said opening when the latter is in its lower position, a removable closure for said opening and means for fixing the same on closed position during the mixing and agitating operation, power means carried by the truck for rotating said mixing and agitating means, and means for arresting the movement of said receptacle for the discharge of the mixed materials through said opening.

ACKERT BICKEL.